United States Patent [19]

Luck

[11] 4,078,480
[45] Mar. 14, 1978

[54] PRODUCT STORAGE APPARATUS

[76] Inventor: Harvey R. Luck, 1259 Parkway Ave., Salt Lake City, Utah 84106

[21] Appl. No.: 677,641

[22] Filed: Apr. 16, 1976

[51] Int. Cl.² ............................................. A23B 7/00
[52] U.S. Cl. ..................................... 99/476; 99/516; 118/24
[58] Field of Search .................. 99/646 S, 646 C, 473, 99/476–477, 516–517; 426/310, 312, 320–322, 331, 335, 419; 21/74 R, 121–126; 98/54–55, 119; 118/24, 25

[56] References Cited

U.S. PATENT DOCUMENTS

| | | | |
|---|---|---|---|
| 2,768,896 | 10/1956 | Lewis | 426/310 |
| 3,008,838 | 11/1961 | Brumsing | 426/419 |
| 3,313,631 | 4/1967 | Jensen | 99/517 |
| 3,592,665 | 7/1971 | Macrill | 99/517 |

Primary Examiner—Harvey C. Hornsby
Assistant Examiner—Robert Pous
Attorney, Agent, or Firm—H. Ross Workman; J. Winslow Young

[57] ABSTRACT

An improved storage apparatus for produce stored in an enclosed storage structure. The apparatus provides a cooled airstream having a relative humidity above 95% which is forced around the produce. Water is pressurized by a pump and sprayed into the airstream to create a mist which cools and humidifies the airstream. Chemicals to retard spoilage of the produce can also be included in the water. The water may also be sprayed directly on the produce. Savings are realized and water accumulation in the storage structure is minimized by recirculating condensate from the air distribution system through the spray apparatus. Prolonged equipment life is also obtained by locating the motor for the pump exteriorly of the water spray.

7 Claims, 2 Drawing Figures

PRODUCT STORAGE APPARATUS

BACKGROUND

1. Field of the Invention

This invention relates to an improved apparatus and method for providing a high-humidity environment for produce in a storage structure.

2. The Prior Art

It is a common procedure to place farm produce, such as potatoes, onions, carrots and the like, in storage until they can be shipped to the produce distribution system. However, it has been noted that produce such as potato tubers become rapidly dessicated unless stored under an atmosphere of high humidity and a moderately cool temperature. The harvested potato tuber also undergoes certain changes during storage including the conversion of starch to sugar and the oxidation of the sugar during respiration with the production of carbon dioxide. Potato mass is thus lost during storage at a rate dependent upon the rate of water loss and respiration.

Furthermore, the starch/sugar ratio may be unfavorably altered depending upon (1) the conversion rate of starch to sugar and (2) the oxidation of the sugar. Additionally, these changes in the potato undergone during storage generate heat which, unless removed, substantially accelerates the deterioration of the potato. It is, therefore, customary to store potatoes where they can be cooled. However, it has been found that when potato tubers are stored at temperatures within the range of about 0° C (freezing) to about 7° C to prevent tuber rot and decay, the respiration process is sufficiently retarded to allow an increase in the sugar concentration. Accordingly, potato tubers stored under these colder conditions for substantial periods of time develop a high sugar concentration rendering the potato tubers inedible.

As a result, it has become conventional practice to store the potato tuber in a high-humidity environment (95-100%) which is cooled to a temperature range of approximately 7° C to 13° C. However, this temperature range permits an increased tendency for the potato tubers to develop microbial storage diseases, such as blight, dry rot, etc. It has, therefore, become conventional to spray or dip the potato tubers in a chemical solution as one means for inhibiting these storage diseases.

These recent advances in the long-term storage of produce have, correspondingly, resulted in the development of additional difficulties, such as (1) water accumulation in the storage structure from condensation of the moisture of the high-humidity environment with (2) a resultant waste of water and (3) decreased equipment life. Particularly injurious to equipment is arcing and corrosion of the electric motors which are operated in the high-humidity environment. Electric motor arcing and corrosion damage occurs even though it has become a common practice to double dip and bake the motors during manufacture to specifically combat these problems.

Additionally, the maintenance of a high-humidity environment consumes vast quantities of water which becomes critical particularly in the arid regions of the West where potatoes are grown under irrigation. It would, therefore, be an improvement in the art to provide an apparatus and method for providing a cooled, high-humidity environment for a storage structure for produce wherein the apparatus (1) reduces water accumulation, (2) recirculates condensate from the air distribution system, (3) provides for an increased life expectancy for the equipment, particularly the electric motors involved in the apparatus, and (4) accommodates injection of chemicals to combat storage diseases into the water so that the chemicals can be carried through the air distribution system or applied directly to the produce.

BRIEF SUMMARY AND OBJECTS OF THE INVENTION

The present invention relates to an improved apparatus and method for providing produce in an enclosed storage structure with a high-humidity environment while minimizing the accumulation of condensate in the storage structure and the air distribution system of the storage structure. The invention includes apparatus for collecting condensate from the air distribution system and recirculating the condensate along with makeup water through the humidity producing apparatus. Pressurized water from a reservoir is conducted to a mist producing apparatus in the air distribution system so as to increase the humidity of air supplied to the produce. Pump motor life is significantly prolonged by isolating it from the high humidity/chemical environment.

It is therefore an object of this invention to provide improvements in the method of supplying a high-humidity atmosphere to produce in an enclosed storage structure.

Another object of this invention is to provide improvements in the apparatus for providing a high-humidity atmosphere for produce in a storage structure.

Another object of this invention is to provide an apparatus whereby chemicals may be amended to the water with which the produce is contacted.

A further object of this invention is to provide means for conserving water while simultaneously reducing the accumulation of water in a storage structure.

A further object of this invention is to provide for prolonged equipment life by isolating the pump motor from the high-humidity environment.

These and other objects and features of the present invention will become more fully apparent from the following description and appended claims taken in conjunction with the accompanying drawing.

DETAILED DESCRIPTION OF THE PREFERRED EMBODIMENTS

Figure 1:
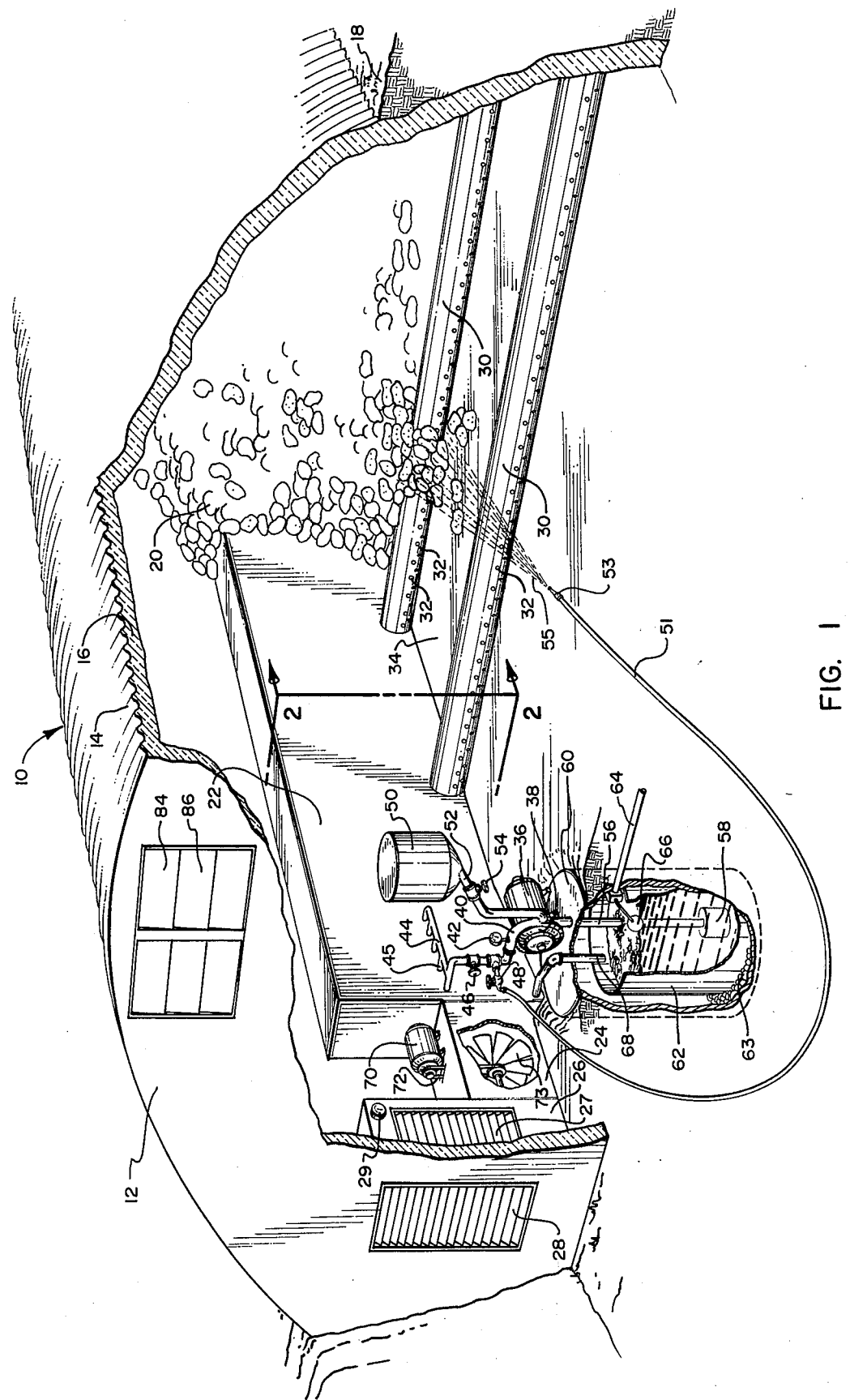
FIG. 1 is a perspective illustration of one presently preferred embodiment of the apparatus of this invention shown in the environment of a storage structure with portions broken away to reveal internal components.

The invention is best understood by reference to the figures wherein like parts are designated with like numerals throughout.

Referring now to the drawing, a storage structure is indicated generally at 10 and includes an arcuate wall and roof structure 14 which is configurated as the surface of a right cylinder. The storage structure is completed by a front wall 12, a floor 34 and a rear wall (not shown). The storage structure 10 is insulated with an insulative layer 16 and is, conventionally, at least partially buried in the earth 18 so as to assist in maintaining a constant inside temperature in storage structure 10. Some conventional structures, however, are entirely above ground.

Farm produce, indicated herein as potatoes 20, is placed in storage structure 10 so as to be under the treatment and controlled atmospheric conditions provided by the apparatus and method of this invention. Clearly, other suitable farm produce may, advantageously, benefit from the method and apparatus of this invention. However, for ease of illustration and understanding, the discussion of the invention will be directed to a potato storage structure, commonly referred to as a "potato cellar."

Storage structure 10 includes an exhaust diffuser 84 having a plurality of pressure actuated vanes 86 which open outwardly to permit the escape of air when the air pressure inside storage structure 10 is an increment greater than the outside atmospheric pressure.

The apparatus for providing the appropriate atmospheric conditions in storage structure 10 has a surprisingly prolonged equipment life and utilizes an air distribution system including an air plenum chamber 22 and a plurality of air distribution conduits 30. An air supply is provided through either or both of air inlets 27 and 28 and by a fan 73. Fan 73 is enclosed in a fan housing 24 and is propelled by a motor 70 which is located outside fan housing 24 and connected to fan 73 by belt 72.

Potatoes give off heat during the respiration process and, unless removed, the heat accumulates and accelerates the deterioration of the potatoes. Accordingly, a thermostat 29 is provided inside the storage structure 10 to sense the temperature rise and to activate the air distribution system. Cooling of the air results from vaporization of water dispensed as a mist in the air and a resultant absorption of the heat of vaporization from the airstream. Historically, air distribution systems in produce storage structures are primarily activated at night so as to advantageously utilize the cooler nighttime air which is drawn through outside air inlet 28. However, air inside storage structure 10 may also be recirculated through inside air inlet 27 in the event the ambient is too warm.

Air plenum chamber 22 extends along the length of storage structure 10 and connects with a plurality of laterally extending air distribution conduits 30 in fluid communication therewith. Air distribution conduits 30 placed on the floor 34, as shown, and extend substantially the entire width of storage structure 10. Air distribution conduits 30 are specifically configured to have produce 20 placed thereon and include a plurality of downwardly oriented holes 32 on the lower wall surfaces thereof, generally below the midline of air distribution conduits 30. The downwardly oriented holes 32 direct the air flow downwardly and outwardly from each side of air distribution conduits 30 to provide a more thorough diffusion of the treated air through the mass of produce 20 heaped between adjacent air distribution conduits 30. The downwardly directed holes 32 also inhibit dirt and other debris from entering air distribution conduits.

Each of air distribution conduits 30 is also, preferentially, provided with a gradual slope toward air plenum chamber 22, the purpose of which will be discussed more fully hereinafter.

Included within the air plenum chamber 22 is a spray apparatus 44 having a plurality of injection tubes 45 which communicate with conventional mist producing sprays (not shown) inside air plenum chamber 22. A pump 38 driven by a motor 36 supplies pressurized water to spray apparatus 44 through a pipe 40. A pressure gauge 42 provides an indication of the pressure within pipe 40. Pump 38 is commercially available as a Model 280 Pump of the Cat Pumps Corporation, Minneapolis, Minn. Motor 36 is also commercially available as a Totally Enclosed Fan Cooled (TEFC) motor rated at 1 hp at 1800 rpm from U.S. Electrical Motors Division of Emerson Electric, Milford, Conn. Clearly, other suitable pump and motor combinations could be used to supply the necessary water pressure for creating the mist (not shown) in air plenum chamber 22.

Importantly, motor 36 is located exteriorly of air plenum chamber 22 so as to isolate it from the high-humidity environment therein and to remove it as a heat source to the air flow. Surprisingly prolonged motor life has been realized by this expedient since it reduces arcing and corrosion of motor 36.

Reservoir 62 provides the water supply for pump 38 and is an open-top container which nests within a diametrically enlarged silo 60. Silo 60 has an open bottom in direct contact with the earth below which is covered by a layer of rocks 63. Rocks 63 serve as a support surface for reservoir 62 and permit overflow water, if any, from reservoir 62 to infiltrate therethrough into the underlying earth.

Water for pump 38 and spray apparatus 44 is provided by the reservoir 62. Water for reservoir 62 includes condensate returned from air distribution conduits 30 and air plenum chamber 22 through a condensate return line 68. A makeup water supply is also provided through a water supply line 64 and is controlled by a float valve 66 which senses the water level in reservoir 62 for the purpose of admitting water when the condensate through condensate return line 68 is insufficient to maintain the water level in reservoir 62. The condensate return will be discussed more fully hereinafter with respect to the description of the apparatus of FIG. 2. The water from reservoir 62 is filtered through a filter 58 prior to passing into water inlet 56 which supplies pump 38.

Pump 38 includes a secondary inlet pipe 52 which leads from a chemical vat 50 and permits the addition of chemicals from chemical vat 50 to the water which is supplied under pressure through pipe 40 to spray apparatus 44. A valve 54 controls the flow of chemicals through pipe 52. Chemicals may be added to the water by placing a suitable chemical in chemical vat 50 and opening valve 54. One suitable chemical usable with the illustrated embodiment of the invention is sold by Merck Chemical Company of New Jersey under the trade name Mertect 340 F. Additionally, actuation of pump 38 while valve 46 is closed and valve 48 to open permits the operator (not shown) to suitably apply the plain or chemically treated water directly as spray 55 to potatoes 20 through hose 51 and nozzle 53. Customarily, nozzle 53 is configured as a plurality of jets (not shown) which are mounted upon a potato loading apparatus (not shown) which distributes produce 20 in storage structure 10. Produce 20 is thereby suitably wetted with the spray 55 during placement in storage structure 10. However, for ease of presentation, spray 55 is shown herein as coming from a portable nozzle 53, it being clearly understood that nozzle 53 could be permanently mounted upon suitable structure as set forth hereinbefore.

Preferentially, chemicals from chemical vat 50 are introduced into the water on the low pressure side of pump 38 so as to eliminate the need for pressurizing chemical vat 50. Clearly, the chemicals could be introduced into pipe 40 at any point between pump 38 and valve 48 to accomplish one of the purposes of this invention. However, as set forth previously, greater simplicity of structure and operation is achieved by introducing the chemicals in the low pressure or inlet side of pump 38.

Figure 2:
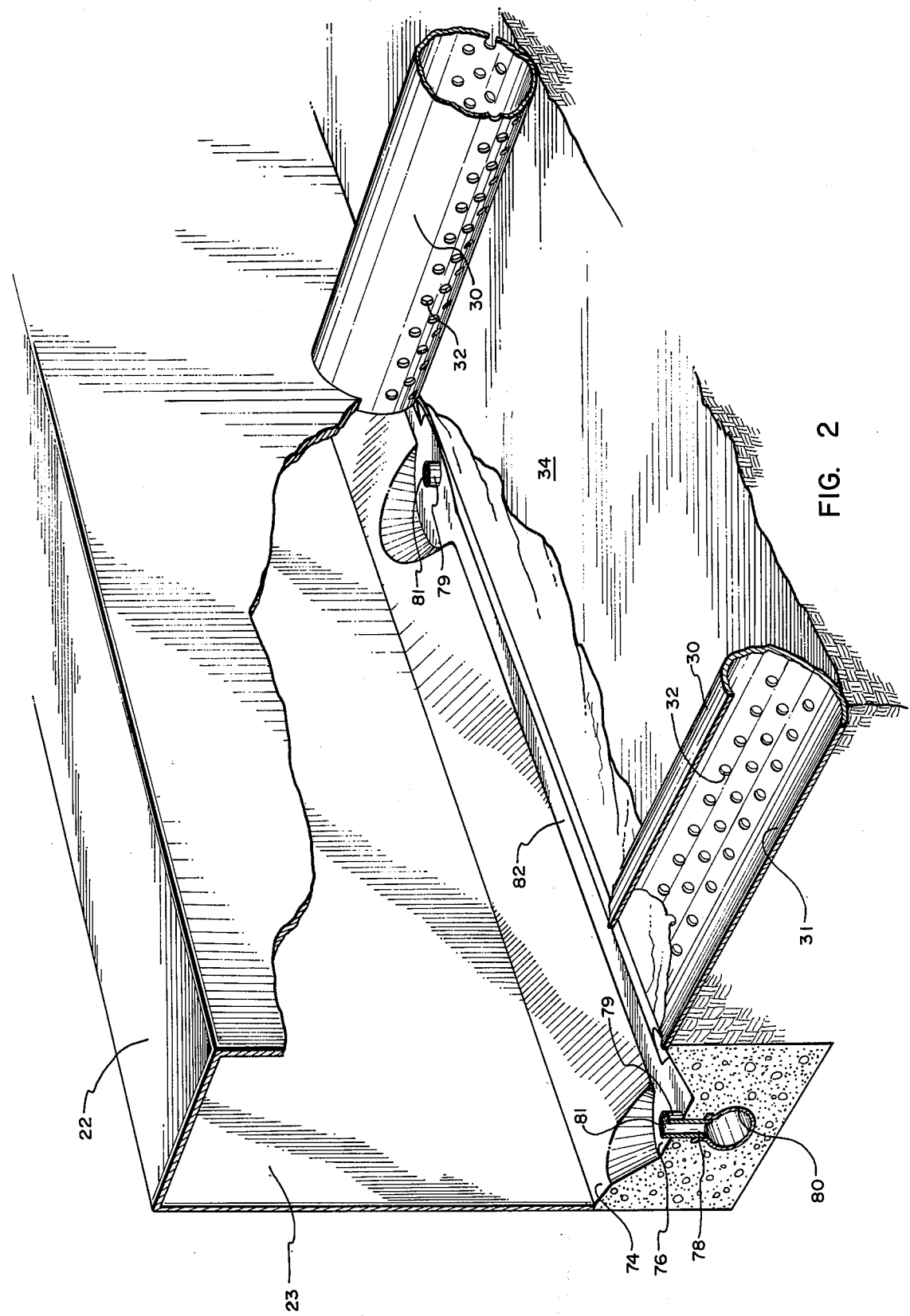
FIG. 2 is an enlarged perspective illustration of a fragment of the structure of FIG. 1 taken along lines 2—2 with portions broken away to reveal internal components.

Referring now more particularly to FIG. 2, air plenum chamber 22 is shown with portions broken away to more clearly reveal the interior 23 and the various features thereof. In particular, air plenum chamber 22 includes a sloped bottom surface 74 which terminates in a channel 82. Channel 82 directs the condensate to one of a plurality of settling basins 76. Channel 82 receives condensate from the internal surfaces 23 of air plenum chamber 22 and may also, preferentially, receive condensate from air distribution conduits 30. Importantly, air distribution conduits 30 and, more particularly, surface 31 therein are placed higher than condensate channel 82 so that channel 82 will serve as a receiving channel for the condensate and not cause condensate to flow into air distribution conduits 30 where it has, historically, been known to flow with disastrous consequences.

Air conduits 30 include a bottom surface 31 which rests on floor 34 and has no holes therein. Advantageously, air conduits 30 may be provided with a gradual slope toward air plenum chamber 22 so as to direct condensate formed therein toward channel 82. However, many replacement and new installations of the apparatus of this invention in existing storage structures results in air conduits 30 being substantially level. Even in this circumstance, condensate will still tend to be directed by surface 31 to channel 82. This feature is significant in that it inhibits condensate from encroaching into produce 20 placed on floor 34.

Settling basins 76 are formed as widened areas of channel 82 and include risers 79 centrally disposed therein. Each of risers 79 is hollow and communicates directly with an underlying condensate conduit 80. Riser 79 extends a discrete distance above the surface of settling basin 76 thereby providing a quiescent zone for collected condensate to assist in removing suspended debris in the condensate. Risers 79 also include a screen 81 which inhibits any floating debris (not shown) carried by the condensate from being drawn into condensate conduit 80 and plugging the same.

In addition to providing a settling basin for suspended debris in the condensate therein, basins 76 supply a supplementary water source for augmenting the humidity in air plenum chamber 22 while simultaneously decreasing the tendency for water stagnation in the air distribution system. The humidity supplied to the air by the sprays 45 (FIG. 1) in air plenum chamber 22 and air distribution conduits 30 is augmented by the pooled water in basins 76. Importantly, stagnation of the pooled water and the consequent development of offensive odors which could impair the value of produce 20 is significantly minimized by the collection of the water in the relatively limited size basins 76 and its relatively frequent replacement with fresh condensate.

Condensate conduit 80 is provided with a gradual slope toward the condensate return line 68 (FIG. 1) so as to direct the collected condensate to reservoir 62 for recycling through pump 38 as has been set forth hereinbefore. Accordingly, surprising savings are realized by the apparatus and method of this invention by recycling condensate from the air distribution system. This invention also inhibits the accumulation of water in the air distribution system which would tend to (1) interfere with the distribution of the humidified air therethrough and (2) damage the produce if the accumulation of condensate became excessive and encroached into produce 20.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In combination with an enclosed storage structure for storing produce, an enclosed storage structure, an air distribution system for the storage structure and an air treating system for the air distribution system comprising in combination:
   an air plenum chamber;
   a plurality of air distribution conduits in fluid communication with the air plenum chamber for conducting air to produce in the storage structure, said conduits being placed on the floor of the enclosed storage structure and at an elevation above the floor of the air plenum chamber;
   spray means for producing a mist in the air plenum chamber to increase the humidity of the air therein;
   means for forcing air through the air plenum chamber and the air distribution conduits to distribute the air having an elevated humidity to the produce in the storage structure;
   drainage means in the air distribution conduits and air plenum chamber, said drainage means comprising a sloped floor for directing condensate from the air distribution conduits and air plenum chamber to a condensate collection site; and
   means for recirculating a portion of the condensate through the spray means.

2. The combination of claim 1 wherein the means for producing a fine spray comprises:
   a plurality of spray nozzles inside the air plenum chamber;
   a pump in fluid communication with the spray nozzles;
   a motor for the pump, the motor being specifically positioned exteriorly of the air plenum chamber;
   a water reservoir;
   means for returning collected condensate to the reservoir;
   water makeup means for maintaining the water level of the reservoir; and
   means for conducting water from the reservoir to the pump, the pump pressurizing the water and directing the water to the spray means.

3. The combination of claim 2 wherein the pump includes means for amending the water with a chemical composition suitable for treating the produce in the storage structure.

4. The combination of claim 3 wherein the pump means further comprises a flexible hose and a spray apparatus at the end of the hose and means for selectively directing the pressurized water alternatively to the spray means and the spray apparatus for applying the liquid directly to the produce.

5. In combination with an enclosed storage structure for storing produce and providing an air flow to the produce, the air flow having an elevated humidity, comprising:

a forced air distribution system for conducting air to the produce, the air distribution system having a slanted bottom surface to accommodate collection of condensate at at least one selected location;

means for spraying water into the air in the air distribution system for increasing the humidity of the air in the air distribution system comprising:

a spray apparatus in the air distribution system;

a motor-driven pump for supplying water under pressure to the spray apparatus, the motor for the pump being placed externally of the air distribution system;

means for selectively delivering chemicals into the water before the water is discharged from the pump;

a secondary spray apparatus comprising a hose and a spray means on the end of the hose, the hose being connected to a valve in the pressurized water system;

valve means between the pump and the spray apparatus, the valve means accommodating selectively bypassing the spray apparatus for delivering pressurized water to the secondary spray apparatus; and water reservoir means for supplying water to the pump comprising means for receiving the condensate collected by the air distribution system and water makeup means to supplement the condensate to maintain a preselected quantity of water in the reservoir; and air delivery means for forcing air into the air distribution system comprising a fan means in the air distribution system and motor means for driving the fan means.

6. The combination of claim 5 wherein the air distribution system comprises an air plenum chamber with a plurality of air distribution conduits extending laterally from the air plenum chamber, the air distribution conduits having perforate lower side walls and being elevated above the floor of the air plenum chamber so as to permit condensate in the air distribution conduits to flow into the air plenum chamber, the air plenum chamber having a sloped floor to direct the condensate to the selected location.

7. The combination of claim 5 wherein the air plenum chamber comprises a sloped floor directing condensate to at least one condensate collecting basin and further comprises a condensate conduit beneath the floor of the air plenum chamber, the basis comprising a widened area in the floor of the air plenum chamber and having a hollow riser extending above the floor of the basin, the riser being covered with a screen to remove debris in the condensate, the riser serving as an overflow drain for the basin by communicating directly with the condensate conduit beneath the floor of the air plenum chamber, the condensate conduit directing the condensate to the reservoir.

* * * * *

UNITED STATES PATENT AND TRADEMARK OFFICE
CERTIFICATE OF CORRECTION

PATENT NO. : 4,078,480
DATED : March 14, 1978
INVENTOR(S) : Harvey R. Luck

It is certified that error appears in the above—identified patent and that said Letters Patent are hereby corrected as shown below:

In the title, "Product" should be --Produce--
Column 1, line 2, "Product" should be --Produce--
Column 8, line 24, "basis" should be --basin--.

Signed and Sealed this

Tenth Day of October 1978

[SEAL]

Attest:

RUTH C. MASON
Attesting Officer

DONALD W. BANNER
Commissioner of Patents and Trademarks